US012675612B2

(12) United States Patent
Chou et al.

(10) Patent No.: US 12,675,612 B2
(45) Date of Patent: Jul. 7, 2026

(54) DATA PROTECTION SYSTEM AND DATA PROTECTION METHOD WHERE A DETERMINATION DEVICE IS USED FOR PROTECTING CRUCIAL DATA FROM BEING ALTERED ILLEGALLY

(71) Applicant: ITE Tech. Inc., Hsinchu (TW)

(72) Inventors: Chia-Yuan Chou, Hsinchu City (TW); An-Chi Tsai, Taipei City (TW)

(73) Assignee: ITE Tech. Inc., Hsinchu (TW)

( * ) Notice: Subject to any disclaimer, the term of this patent is extended or adjusted under 35 U.S.C. 154(b) by 29 days.

(21) Appl. No.: 18/797,475

(22) Filed: Aug. 7, 2024

(65) Prior Publication Data

US 2025/0322107 A1    Oct. 16, 2025

(30) Foreign Application Priority Data

Apr. 11, 2024    (TW) ................................. 113113469

(51) Int. Cl.
*G06F 21/79* (2013.01)
*G06F 21/54* (2013.01)

(52) U.S. Cl.
CPC .............. *G06F 21/79* (2013.01); *G06F 21/54* (2013.01)

(58) Field of Classification Search
CPC .. G06F 21/50–54; G06F 21/60; G06F 21/604; G06F 21/62–629; G06F 21/78–805; G06F 2221/2141
See application file for complete search history.

(56) References Cited

U.S. PATENT DOCUMENTS 8,041,912 B2    10/2011 Kuo
2014/0006692 A1*    1/2014 Berntsen ................. G06F 21/77
711/103

FOREIGN PATENT DOCUMENTS

TW        I451248 B    9/2014

* cited by examiner

*Primary Examiner* — Kevin Bechtel
(74) *Attorney, Agent, or Firm* — Winston Hsu

(57) ABSTRACT
A data protection system includes a determination device and a second storage unit. The determination device can be used to receive an execution instruction, determine whether the execution instruction is corresponding to a protected data area or a non-protected data area of a first storage unit, and control a data adjustment operation accordingly. The second storage unit can be coupled to the determination device and used to store ordinary data and crucial data. If the execution instruction and the data adjustment operation are corresponding to the non-protected data area, the data adjustment operation is only allowed to access the ordinary data, and the data adjustment operation is prohibited to access the crucial data.

3 Claims, 4 Drawing Sheets

DATA PROTECTION SYSTEM AND DATA PROTECTION METHOD WHERE A DETERMINATION DEVICE IS USED FOR PROTECTING CRUCIAL DATA FROM BEING ALTERED ILLEGALLY

BACKGROUND OF THE INVENTION

1. Field of the Invention

The disclosure is related to a data protection system and a data protection method, and more particularly, a data protection system and a data protection method where a determination device is employed to safeguard crucial data from unauthorized modifications.

2. Description of the Prior Art

In the realm of memory utilization, program code can be captured, and the processor can process the program code and access data at specific addresses in the memory based on the results of the processing. If crucial data, such as passwords or related data for authentication, is stored in the memory, safeguarding the crucial data is a major challenge in information security.

For instance, a hacker has the potential to alter the program code and execute the modified program code, thereby gaining access to memory sections housing crucial data. Alternatively, he could manipulate the original authentication process to bypass execution, effectively breaching the confidentiality protocol. Consequently, an appropriate solution is in need to safeguard crucial data.

SUMMARY OF THE INVENTION

An embodiment provides a data protection system including a determination device, a first storage unit and a second storage unit. The determination device is used to receive an execution instruction, determine whether the execution instruction is corresponding to a protected data area or a non-protected data area of the first storage unit, and control a data adjustment operation accordingly. The second storage unit is coupled to the determination device, and is used to store ordinary data and crucial data. If the execution instruction and the data adjustment operation are corresponding to the protected data area, the data adjustment operation is allowed to access the ordinary data and the crucial data.

Another embodiment provides a data protection system including a determination device, a first storage unit and a second storage unit. The determination device is used to receive an execution instruction, determine whether the execution instruction is corresponding to a protected data area or a non-protected data area of the first storage unit, and control a data adjustment operation accordingly. The second storage unit is coupled to the determination device, and configured to store ordinary data and crucial data. If the execution instruction and the data adjustment operation are corresponding to the non-protected data area, the data adjustment operation is only allowed to access the ordinary data, and the data adjustment operation is prohibited from accessing the crucial data.

Another embodiment provides a data protection method of a data protection system. The data protection method includes transmitting an execution instruction to a determination device, the determination device determining whether the execution instruction is corresponding to a protected data area or a non-protected data area of a first storage unit, and the determination device permitting or denying an access of a data adjustment operation to crucial data in a second storage unit according to whether the execution instruction corresponds to the protected data area or the non-protected data area of the first storage unit.

These and other objectives of the present invention will no doubt become obvious to those of ordinary skill in the art after reading the following detailed description of the preferred embodiment that is illustrated in the various figures and drawings.

DETAILED DESCRIPTION

During the development stage, the program code stored in a memory (for example, flash memory) can be updated or modified according to requirements, enabling a processor (such as microprocessor) to execute various programs. After development is complete, the program code (for example, firmware) can be burned into the memory. When certain conditions are met, the program code can be executed to alter crucial data, such as passwords or authentication-related information. After leaving the factory, since the program code is still alterable, hackers can update the program code, allowing the processor to execute the updated program code to modify crucial data even without meeting specific conditions.

To properly protect crucial data, a trusted zone can be set up in the overall system. Within this trusted zone, a secure processor, secure memory, encryption hardware, a secure real-time timer, secure boot programs, and secure software management programs can be set up and applied. Through this, security checks can be set up. Crucial data can be accessed only when the security checks are passed and the necessary permissions are granted. While this solution is feasible, it requires more resources, such as the use of dual processors, which leads to a more complex circuit and higher costs. The following will describe a simpler solution.

Figure 1:
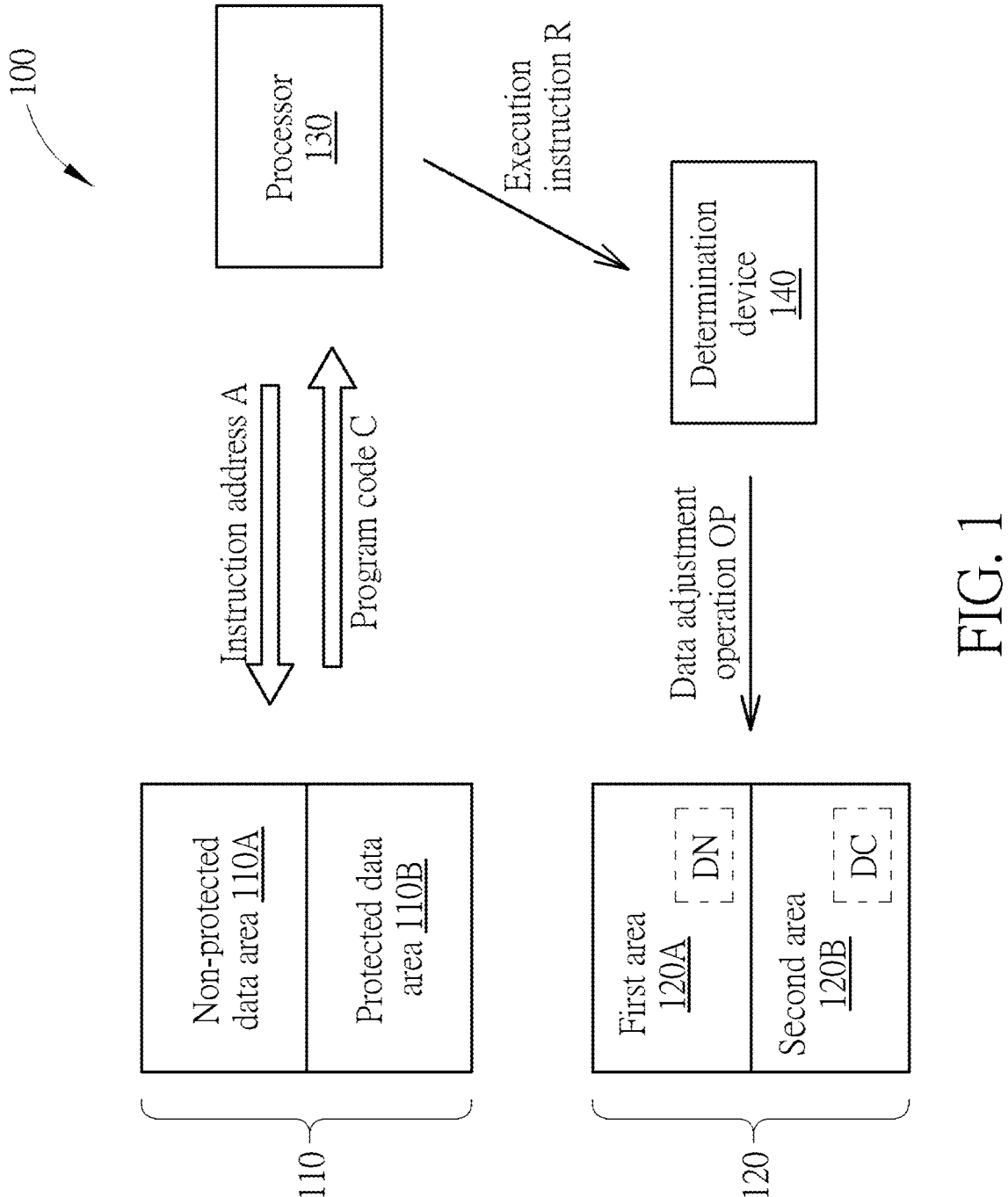
FIG. 1 illustrates a data protection system according to an embodiment.

FIG. 1 illustrates a data protection system 100 according to an embodiment. The data protection system 100 can include a first storage unit 110, a second storage unit 120, a processor 130 and a determination device 140.

The first storage unit 110 can include a non-protected data area 110A and a protected data area 110B. The non-protected data area 110A can store an alterable program code, and the protected data area 110B can store an unalterable program code.

Before the data protection system 100 leaves the factory, the program code in the protected data area 110B can be alterable. After the data protection system 100 has been manufactured and leaves the factory, a locking mechanism can be triggered by blowing a fuse and/or writing to a register to render the program code in the protected data area 110B unalterable.

The second storage unit 120 can include a first area 120A and a second area 120B. The first area 120A can store ordinary data DN, and the second area 120B can store crucial data DC such as passwords and authentication-related information.

The processor 130 can be coupled to the first storage unit 110 and the determination device 140, and be used to generate an execution instruction R according to a program code C provided from the first storage unit 110. The processor 130 can output an instruction address A to the first storage unit 110. The first storage unit 110 can provide the program code C to the processor 130 according to the instruction address A. The processor 130 can process the fetched program code C to generate the execution instruction R, and output the execution instruction R to the determination device 140. The processor 130 can include a microprocessor, or another suitable processor.

The determination device 140 can be coupled to the processor 130 and the second storage unit 120. The determination device 140 can perform a data adjustment operation OP according to the execution instruction R. The determination device 140 can include an application specific integrated circuit (ASIC). The determination device 140 can include suitable software, hardware, and/or firmware.

The determination device 140 can determine whether the execution instruction R corresponds to the protected data area 110B or the non-protected data area 110A of the first storage unit 110, to allow or deny an access of the data adjustment operations to the crucial data DC in the second storage unit 120.

If the execution instruction R and the data adjustment operation OP correspond to the protected data area 110B, the determination device 140 can permit the access of the data adjustment operation OP to the ordinary data DN and the crucial data DC. If the execution instruction R and the data adjustment operation OP correspond to the non-protected data area 110A of the first storage unit 110, the determination device 140 can only permit the access of the data adjustment operation OP to the ordinary data DN and deny the access of the data adjustment operation OP to the crucial data DC.

Figure 2:
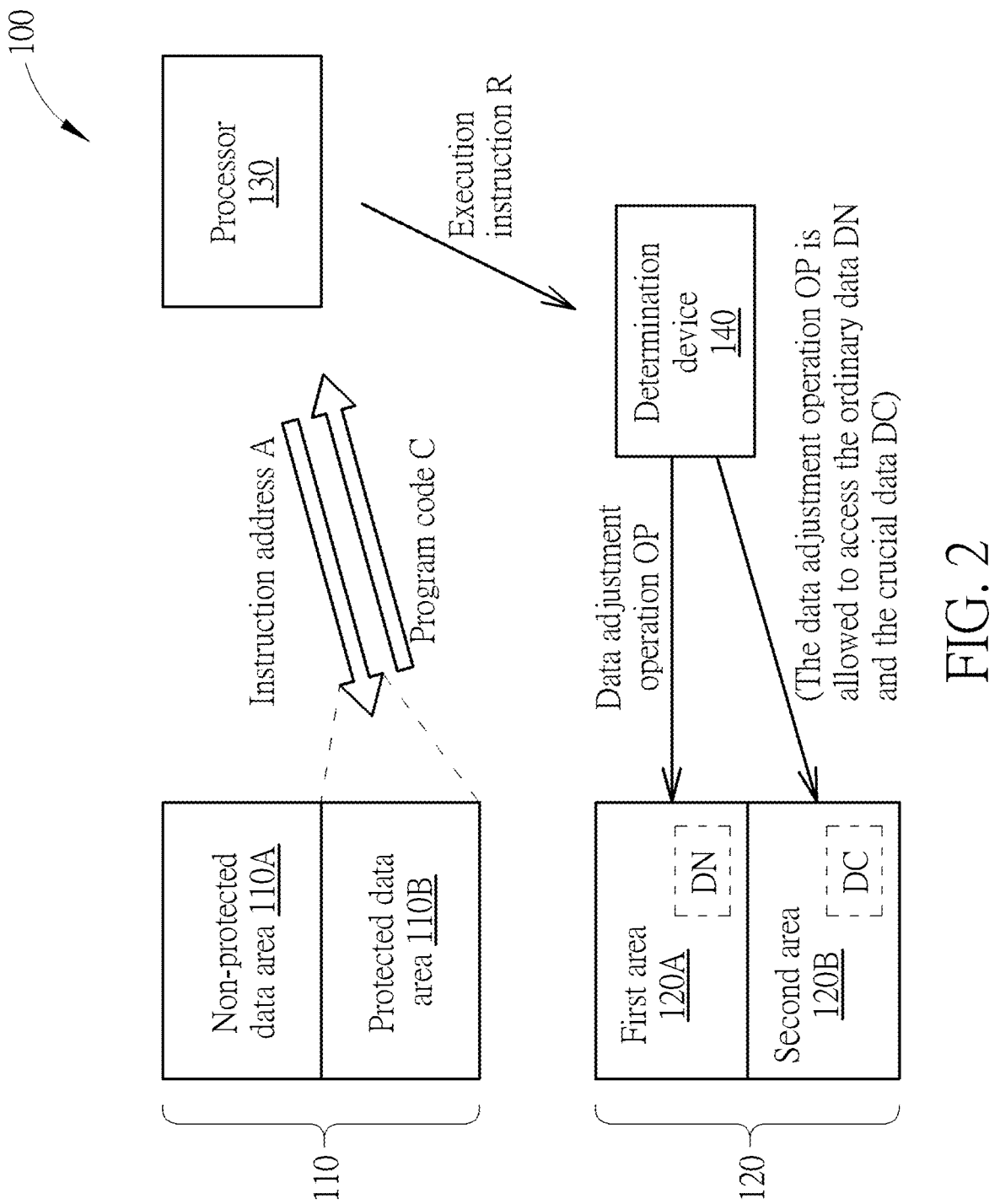
FIG. 2 illustrates the data protection system in FIG. 1 where the instruction address, the program code, the execution instruction and the data adjustment operation correspond to the protected data area.

FIG. 2 illustrates the data protection system 100 in FIG. 1 where the instruction address A, the program code C, the execution instruction R and the data adjustment operation OP correspond to the protected data area 110B. In FIG. 2, the instruction address A corresponds to the protected data area 110B. Therefore, in FIG. 2, the program code C can be fetched from the protected data area 110B, and the execution instruction R and data adjustment operation OP correspond to the protected data area 110B. Hence, the data adjustment operation OP is allowed to access the ordinary data DN and the crucial data DC. For example, in FIG. 2, the data adjustment operation OP is allowed to access crucial data DC such as passwords and authentication-related data.

Figure 3:
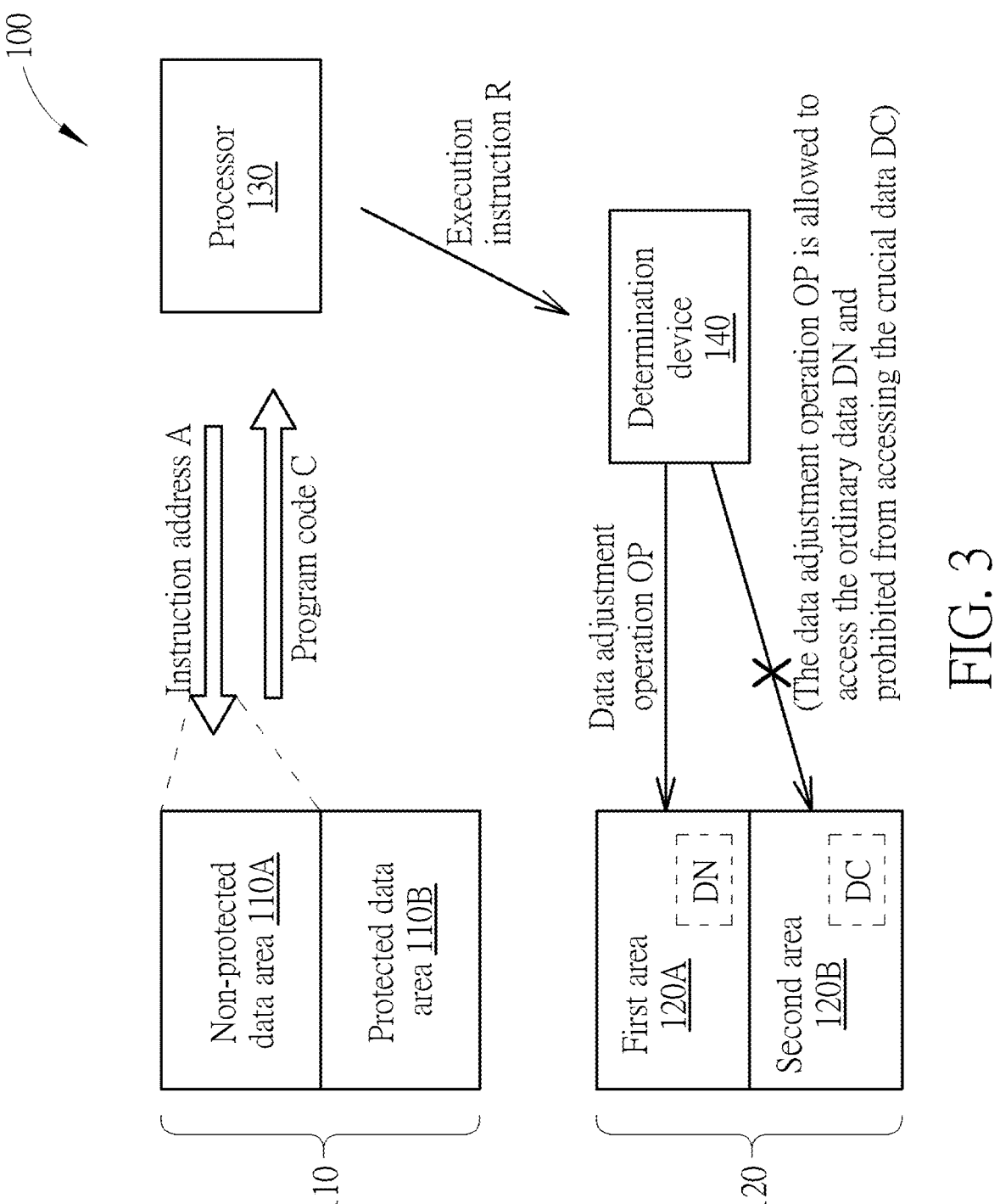
FIG. 3 illustrates the data protection system in FIG. 1 where the instruction address, the program code, the execution instruction and the data adjustment operation correspond to the non-protected data area.

FIG. 3 illustrates the data protection system 100 in FIG. 1 where the instruction address A, the program code C, the execution instruction R and the data adjustment operation OP correspond to the non-protected data area 110A. In FIG. 3, the instruction address A corresponds to the non-protected data area 110A. Therefore, in FIG. 3, the program code C is fetched from the non-protected data area 110A, and the execution instruction R and data adjustment operation OP correspond to the non-protected data area 110A. Hence, the data adjustment operation OP is allowed to access the ordinary data DN and prohibited from accessing the crucial data DC. For example, in FIG. 3, the data adjustment operation OP is prohibited from accessing crucial data such as passwords and authentication-related data.

In FIG. 1, FIG. 2 and FIG. 3, the first storage unit 110 can be a first portion of a memory, and the second storage unit 120 can be a second portion of the memory. In other words, the first storage unit 110 and the second storage unit 120 can be different portions of the same memory.

In another embodiment, the first storage unit 110 can be in a first memory, and the second storage unit 120 can be in a second memory. In other words, the first storage unit 110 and the second storage unit 120 can be in different memories.

The non-protected data area 110A of the first storage unit 110 can be implemented using a flash memory. The protected data area 110B of the first storage unit 110 can be implemented using a flash memory or a read-only memory (ROM). The second storage unit 120 can be implemented using a flash memory.

Figure 4:
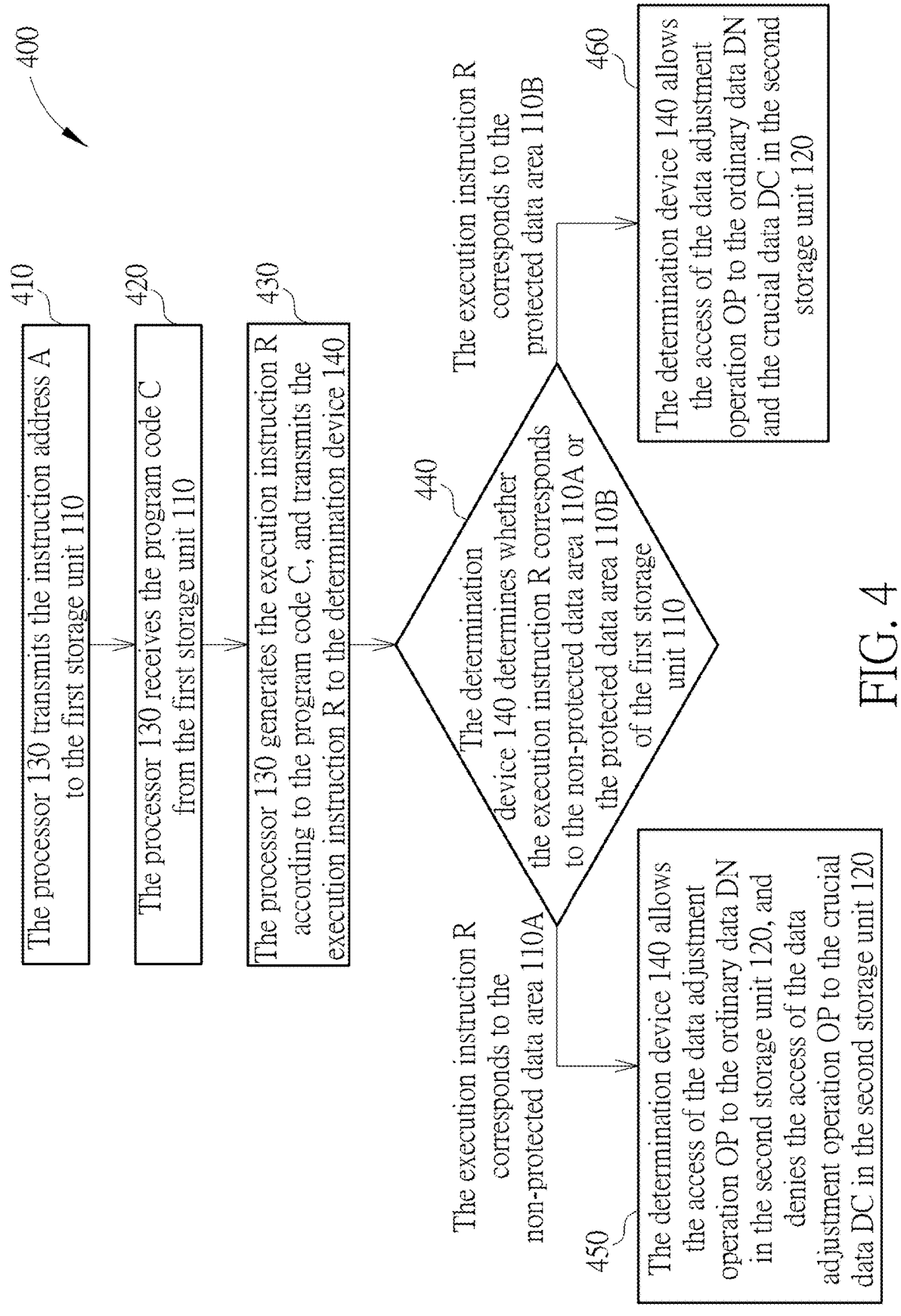
FIG. 4 illustrates a data protection method of the data protection system according to an embodiment.

FIG. 4 illustrates a data protection method 400 of the data protection system 100 according to an embodiment. The data protection method 400 can include the following steps.

Step 410: the processor 130 transmits the instruction address A to the first storage unit 110;

Step 420: the processor 130 receives the program code C from the first storage unit 110;

Step 430: the processor 130 generates the execution instruction R according to the program code C, and transmits the execution instruction R to the determination device 140;

Step 440: the determination device 140 determines whether the execution instruction R corresponds to the non-protected data area 110A or the protected data area 110B of the first storage unit 110; if the execution instruction R corresponds to the non-protected data area 110A, enter Step 450; if the execution instruction R corresponds to the protected data area 110B, enter Step 460;

Step 450: the determination device 140 allows the access of the data adjustment operation OP to the ordinary data DN in the second storage unit 120, and denies the access of the data adjustment operation OP to the crucial data DC in the second storage unit 120.

Step 460: the determination device 140 allows the access of the data adjustment operation OP to the ordinary data DN and the crucial data DC in the second storage unit 120.

In Step 440, if the execution of instruction R corresponds to the non-protected data area 110A of the first storage unit 110, it indicates that the program code C is an unprotected code, so the data adjustment operation OP is prohibited from accessing the crucial data DC in the second storage unit 120. Therefore, the crucial data DC can be protected to prevent unauthorized access.

In step 440, if the execution of instruction R corresponds to the protected data area 110B of the first storage unit 110, it indicates that the program code C is a protected code, so it allows the access of the data adjustment operation OP to the crucial data DC in the second storage unit 120.

Utilizing the data protection system 100 and method 400, unauthorized access such as code modifications in the first storage unit 110 by intruders (e.g., hackers) can be prevented. This safeguards against illegal access to memory sections containing crucial data. It also thwarts attempts by intruders to disable the original authentication process in order to breach the security mechanism. Consequently, this provides a robust protection mechanism that enhances information security.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data protection method of a data protection system, the data protection system comprising a first storage unit, a second storage unit, a processor and a determination device, the data protection method comprising:

the processor sending an instruction address to the first storage unit, the instruction address indicating a location in either a non-protected data area or a protected data area of the first storage unit;

the first storage unit sending a program code to the processor based on the instruction address;

the processor generating an execution instruction based on the program code wherein the execution instruction indicates whether the program code is originated from the non-protected data area or the protected data area of the first storage unit;

the processor transmitting the execution instruction to the determination device;

the determination device determining whether the program code is originated from the protected data area or the non-protected data area of the first storage unit based on the execution instruction;

the determination device permitting or denying an access of a data adjustment operation to crucial data in a second storage unit solely based on whether the execution instruction corresponds to the protected data area or the non-protected data area of the first storage unit without examining which portion of the second storage unit is being accessed by the data adjustment operation; and triggering a locking mechanism by blowing a fuse to render a code stored in the protected data area of the first storage unit unalterable after the data protection system has been manufactured and leaves a factory.

2. The data protection method of claim 1, wherein the determination device permits the access of the data adjustment operation to the crucial data in the second storage unit if the execution instruction corresponds to the protected data area of the first storage unit.

3. The data protection method of claim 1, wherein the determination device denies the access of the data adjustment operation to the crucial data in the second storage unit if the execution instruction corresponds to the non-protected data area of the first storage unit.

* * * * *